United States Patent
Forsgren et al.

(10) Patent No.: US 10,647,264 B2
(45) Date of Patent: May 12, 2020

(54) DISPLAY ASSEMBLY FOR AN INTERIOR PANEL IN A VEHICLE

(71) Applicant: VOLVO CAR CORPORATION, Gothenburg (SE)

(72) Inventors: Daniel Forsgren, Gothenburg (SE); John Kinsey, Ventura, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 290 days.

(21) Appl. No.: 14/923,689

(22) Filed: Oct. 27, 2015

(65) Prior Publication Data
US 2016/0121805 A1    May 5, 2016

(30) Foreign Application Priority Data

Nov. 3, 2014    (EP) .................................... 14191393

(51) Int. Cl.
| | | |
|---|---|---|
| *B60R 11/02* | (2006.01) | |
| *B60K 37/04* | (2006.01) | |
| *B60R 21/02* | (2006.01) | |
| *B60N 3/00* | (2006.01) | |
| *B60R 11/00* | (2006.01) | |

(52) U.S. Cl.
CPC .......... *B60R 11/0235* (2013.01); *B60K 37/04* (2013.01); *B60N 3/002* (2013.01); *B60R 21/02* (2013.01); *B60K 2370/152* (2019.05); *B60R 2011/0003* (2013.01); *B60R 2011/0012* (2013.01); *B60R 2011/0082* (2013.01); *B60R 2011/0092* (2013.01); *B60R 2021/0293* (2013.01)

(58) Field of Classification Search
CPC .. B60K 2350/106; B60K 37/04; B60N 3/002; B60R 11/0235; B60R 2011/0003; B60R 2011/0012; B60R 2011/0082; B60R 2011/0092; B60R 2021/0293; B60R 21/02; F16B 19/10; F16B 21/04; F16J 15/10

USPC ................................ 224/483; 348/148, 837
See application file for complete search history.

(56) References Cited

U.S. PATENT DOCUMENTS

| | | | |
|---|---|---|---|
| 6,304,173 B2 * | 10/2001 | Pala ..................... | B60R 11/0235 340/461 |
| 6,663,155 B1 * | 12/2003 | Malone ............... | B60R 11/0229 224/539 |

(Continued)

FOREIGN PATENT DOCUMENTS

| | | | | |
|---|---|---|---|---|
| DE | 3708404 A1 * | 9/1988 | ............... | B60R 7/06 |
| DE | 102005052030 A1 | 5/2007 | | |

(Continued)

OTHER PUBLICATIONS

Extended European Search Report dated May 8, 2015, Application No. 14191393.9-1503, Applicant Volvo Car Corporation, 5 Pages.

(Continued)

*Primary Examiner* — Christopher S Kelley
*Assistant Examiner* — Kathleen M Walsh
(74) *Attorney, Agent, or Firm* — Brooks Kushman P.C.

(57) ABSTRACT

Example embodiments presented herein are directed towards a display assembly for an interior panel of a vehicle, corresponding method of use and a computer readable medium including instructions for operating the display assembly. The display assembly allows for the private viewing of multimedia content for occupants in a vehicle.

26 Claims, 10 Drawing Sheets

(56) References Cited

U.S. PATENT DOCUMENTS

| | | | |
|---|---|---|---|
| 6,997,508 B2 * | 2/2006 | Jaaska, Sr. | B60N 2/4613 297/188.14 |
| 2003/0128103 A1 * | 7/2003 | Fitzpatrick | B60K 35/00 340/425.5 |
| 2006/0108820 A1 * | 5/2006 | Vican | B60R 11/0235 296/37.12 |
| 2007/0068366 A1 * | 3/2007 | Hamaoka | B60R 11/02 84/423 R |
| 2008/0036925 A1 | 2/2008 | Hsaio | |
| 2009/0316057 A1 * | 12/2009 | Campbell | B60K 35/00 348/837 |
| 2012/0262868 A1 * | 10/2012 | Kato | B60R 11/0235 361/679.21 |
| 2013/0070171 A1 * | 3/2013 | Boyer, Jr. | H04N 5/655 348/837 |
| 2015/0136928 A1 * | 5/2015 | Fischer | B60R 11/0252 248/289.11 |
| 2015/0138449 A1 * | 5/2015 | Rawlinson | G06F 3/1454 348/837 |
| 2016/0089979 A1 * | 3/2016 | Bianchi | G06F 3/14 701/49 |

FOREIGN PATENT DOCUMENTS

| | | |
|---|---|---|
| EP | 0551078 A1 | 7/1993 |
| EP | 0976616 A1 | 2/2000 |
| FR | 2923779 A1 | 5/2009 |
| JP | 2006143109 A * | 6/2006 |
| JP | 2009001065 A * | 1/2009 |
| JP | 2009001065 A * | 1/2009 |
| WO | 9746422 A1 | 12/1997 |

OTHER PUBLICATIONS

DE102005052030A1, Abstract & Machine Translation.
EP0976616A1, Abstract & Machine Translation.
FR2923779A1, Abstract & Machine Translation.
JP2006143109A, Abstract & Machine Translation.
JP2009001065A, Abstract & Machine Translation.
WO9746422A1, Abstract & Machine Translation.
Chinese Office Action dated Feb. 25, 2019, Application No. 201510702126.8, Applicant Volvo Car Corporation, 8 Pages (English machine translation—12 pages).
Chinese Office Action dated Nov. 22, 2019, Application No. 201510702126.8, Applicant Volvo Car Corporation, 7 Pages (English Machine Translation, 7 pages).

* cited by examiner

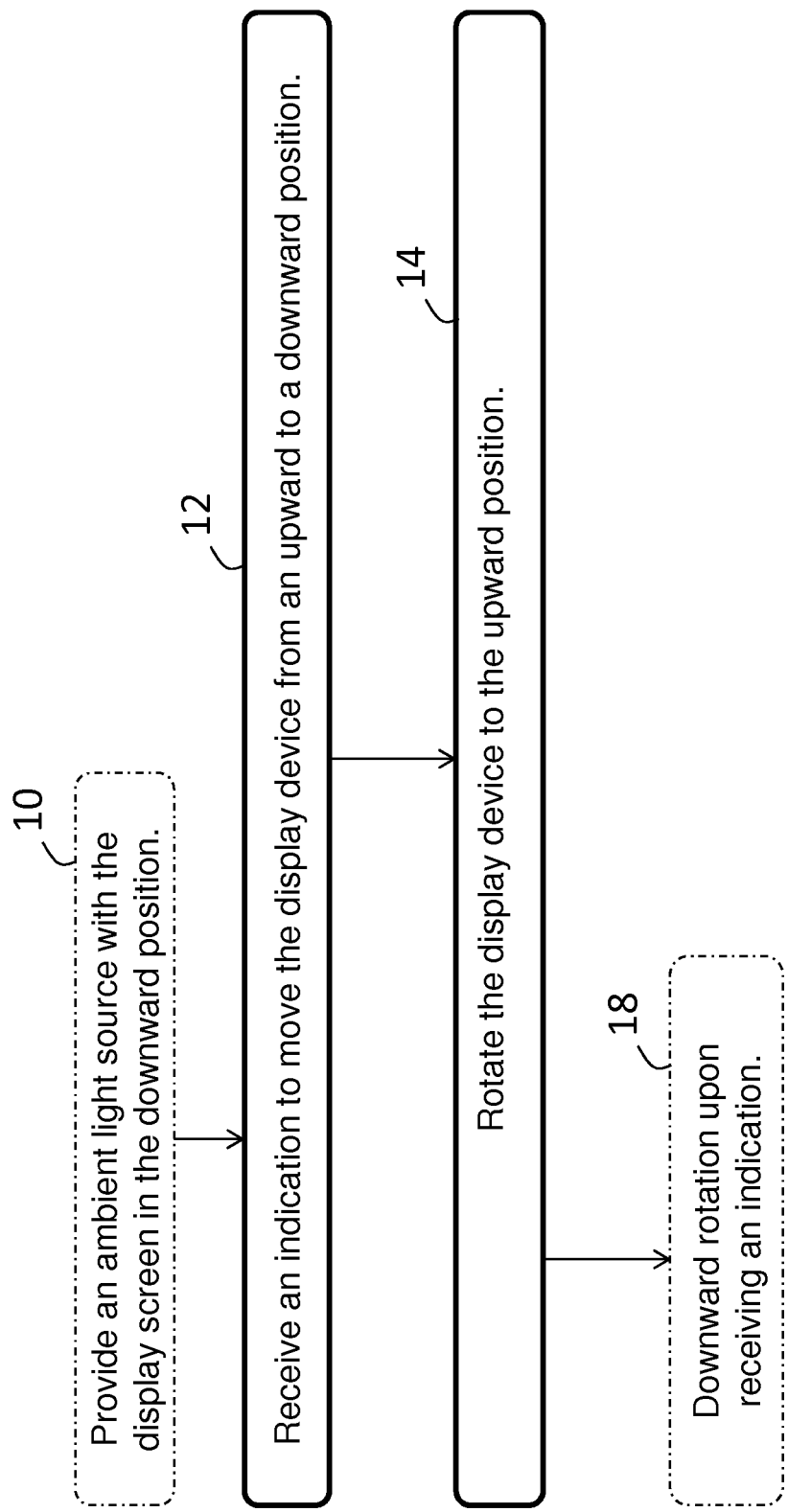

DISPLAY ASSEMBLY FOR AN INTERIOR PANEL IN A VEHICLE

CROSS-REFERENCE TO RELATED APPLICATIONS

This application claims foreign priority benefits under 35 U.S.C. § 119(a)-(d) to European patent application number EP 14191393.9, filed Nov. 3, 2014, which is incorporated by reference in its entirety.

TECHNICAL FIELD

Example embodiments presented herein are directed towards a display assembly, and corresponding method, for an interior panel in a vehicle. A vehicle a car, truck, bus, construction equipment, as well as an airplanes, boat, ship, space craft and any other means of transportation.

BACKGROUND

Many of today's vehicles comprise multimedia systems. A vehicle multimedia system provides various forms of content, for example video or audio, to occupants of the vehicle. Such multimedia systems can be especially beneficial for drivers of autonomous vehicles where driver distraction is not a safety concern in certain phases of operation.

An autonomous vehicle is one which is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones. Thus, a vehicle's initial driving segment will likely require the human driver to control the vehicle and later transition to an autonomous driving mode. While in an autonomous driving mode, a driver of a vehicle may engage in activities which may not be possible while the vehicle is in a manual driving mode. Examples of such activities are resting, working or using multimedia applications.

SUMMARY

A need exists for providing a multimedia system which allow for private screening while providing multimedia content to occupants of the vehicle. A further need exists for providing a multimedia system which may be used during an autonomous driving mode. Thus, at least one object of some of the example embodiments presented herein is to provide a display system for private viewing. A further example object of some of the example embodiments presented herein is to provide a multimedia system which may be used during autonomous driving.

Accordingly, some of the example embodiments are directed towards a display assembly for an interior panel of a vehicle. The display assembly comprises a display device with a display screen on a front surface. The front surface is configured to face a direction of a floor of the vehicle when the display device is in a downward position. The display assembly further comprises a pivot connectable to an edge of the display device and a surface of the vehicle interior panel. The display assembly further comprises a control unit configured to initiate a rotation of the pivot to move the display device from the downward position to an upward position such that the display screen faces a backend of the vehicle.

An example advantage of the display assembly is that as it is situated in the interior panel, the occupants may view the material on the display screen with privacy. Specifically, as the display screen is located just below the eye-level of an average occupant, the screen provides an optimal viewing angle for occupants in the vehicle but occupants of nearby vehicles will have difficulty viewing the material on the screen.

Furthermore, according to some of the example embodiments, the viewing screen is configured to be in a downward direction, facing a floor of the vehicle, when the vehicle is in a manual driving mode. When the vehicle enters an autonomous driving mode, the display screen is configured to pivot to face the backend of the vehicle. Thus, the display assembly does not provide a distraction to the driver of the vehicle when the vehicle is in a manual driving mode. Such an embodiment is useful when the display screen in large. It should be appreciated that according to some of the example embodiments, the display screen may also be in an upward position when the vehicle is not in autonomous driving mode.

According to some of the example embodiments, the display assembly may further comprise a user input device configured to receive a user command from a vehicle occupant. The control unit is configured to initiate the rotation of the pivot upon receipt of the display control input. The user command may be used to initiate the rotation of the display device when the vehicle is in either a manual or autonomous driving mode.

An example advantage of the user input device is that an occupant of the vehicle is able to control the motion of the display screen of the display assembly. Thus, the display screen may be pivoted back and forth from the upward and downward positions automatically based on the driving mode of the vehicle or manually based on a command from an occupant of the vehicle.

According to some of the example embodiments, the display device is configured to be in the upward position upon detecting that a rearward refraction of a front seat of the vehicle has reached a predetermined distance. The front seat may be either the driver or passenger seat. An example advantage of this example embodiment is that due to the size of the display screen, an optimal viewing distance may be obtained once the front seat is retracted rearward. In such example embodiments, the display device may be rotated in the upward position in both an autonomous and manual driving mode.

It should be appreciated that the control unit may also be configured to initiate a rotation of the display device in a downward direction based on a user command, an expected end of an autonomous driving mode, or a detected retraction of a front seat in a forward direction, as explained above.

According to some of the example embodiments, the display assembly may further comprise the user input device such that the user input device is configured to remain within a predetermined distance to at least one front seat of the vehicle.

An example advantage of having the user input device remain a predetermined distance to at least one front seat of the vehicle is that the occupant of the at least one front seat will always be within reach of the user input device, even if the seat is in a retracted or reclined position.

According to some of the example embodiments, the predetermined distance may be maintained by the user input device being attachable to the at least one front seat. Alternatively, the user input device may be comprised on a slide-able rail which allows the user input device to retract in a forward and backward direction such that the predetermined distance with respect to the at least one front seat is maintained.

According to some of the example embodiments, the display screen is configured to provide an ambient light source when the display device is in the downward position. The example advantage of the display screen providing an ambient light source is that the screen may provide a dual purpose. For example, in addition to providing viewable material while the vehicle is in an autonomous driving mode, the display may also be used as a light source when the vehicle is in a manual driving mode or in a downward facing position.

According to some of the example embodiments, the pivot is a first pivot, the edge of the display is a first edge of the display device and the surface of the interior panel is a first surface of the vehicle interior panel. The display assembly further comprises a second pivot connected to a second edge of the display device and a second surface of the vehicle interior panel. According to these example embodiments, the first and second edges are on opposite ends of the display device and the first and second surfaces of the vehicle interior are facing opposite one another. Thus, the display screen may be connected to two points of the interior panel. An example advantage of having a dual pivot system is that more stability may be provided for the rotation of the display device.

According to some of the example embodiments, a back surface of the display device comprises a storage compartment, air distribution system, or an air bag occupant protection system. Thus, in when the display screen is in the downward position, the storage compartment, air distribution system, or an air bag occupant protection system may be utilized. It should be appreciated that the back surface of the display screen may comprise a soft surface such that to lessen the harm which may be done to an occupant of a vehicle during a crash. It should further be appreciated that according to some of the example embodiments, the back surface of the display device may be used as a working space, for example in the form of a table of desk, when the display device is in the downward position.

Some of the example embodiments are directed towards a method of providing the display assembly described above. Some of the example embodiments are directed towards a vehicle comprising the display assembly described above. Some of the example embodiments are directed towards a computer readable medium comprising program instructions for providing the display assembly in an interior panel of a vehicle, as described above. The execution of the program instructions by one or more processors of a computer system causes the one or more processors to carry out the step of receiving a user command to move the display device from the downward position to an upward position, where the front surface of the display device is oriented toward the vehicle occupant. The execution of the program instructions also provide the step of rotating the display device to the upward position upon recitation of the user command.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the example embodiments.

FIG. 6 is a flow diagram illustrating example operations which may be taken by the display assembly of FIGS. 1A-3, according to some of the example embodiments.

DETAILED DESCRIPTION

In the following description, for purposes of explanation and not limitation, specific details are set forth, such as particular components, elements, techniques, etc. in order to provide a thorough understanding of example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

The terminology used herein is for the purpose of describing the example embodiments and is not intended to limit the embodiments presented herein. It should be appreciated that the example embodiments discussed herein are in relation to a vehicle. The figures provided feature the vehicle in the form of a car. However, it should be appreciated that a vehicle shall be interpreted to include cars, trucks, busses and construction equipment, as well as airplanes, boats, ships, space craft and any other means of transportation.

A need exists for providing a multimedia system which allows for private screening while providing multimedia content to occupants of the vehicle. A further need exists for providing a multimedia system which may be used during an autonomous driving mode. Thus, at least one object of some of the example embodiments presented herein is to provide a display system for private viewing. A further example object of some of the example embodiments presented herein is to provide a multimedia system which may be used during autonomous driving.

Figure 1A:
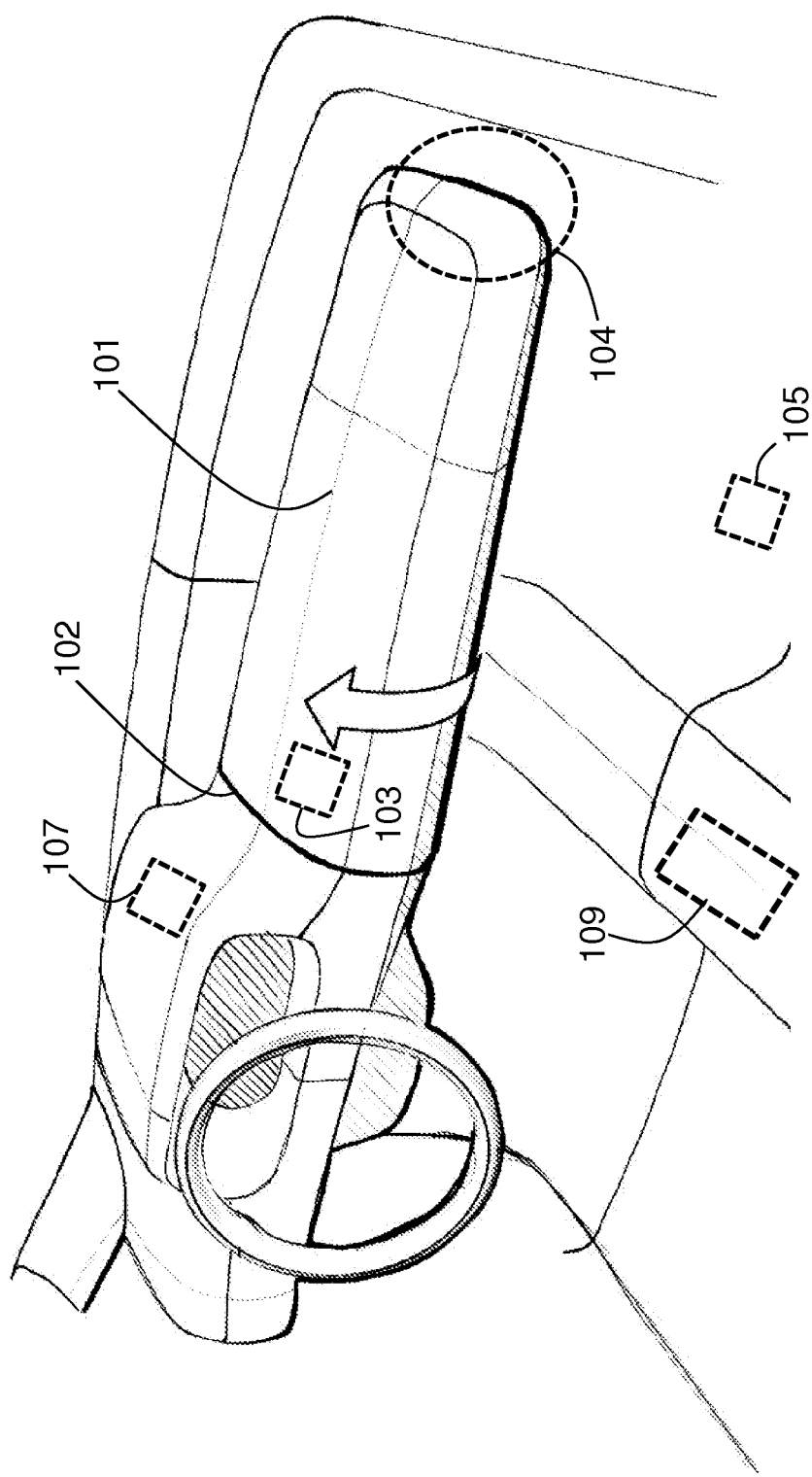
FIGS. 1A-1C are illustrative examples of a single pivot display assembly, according to some of the example embodiments.

FIG. 1A illustrates an interior panel of a vehicle. The interior panel features a display assembly. The display assembly comprises a display device 101. The display device of FIG. 1A comprises a single connection to the interior panel. Specifically, the leftmost portion 102 of the display device 101 is in connection to the interior panel, while the rightmost portion 104 of the display device 101 is free of any connections. Example dimensions of the display screen are 400 to 600 mm. It should be appreciated that while the example provided in the figures provides the display device in a front interior surface, the display device may be comprised within any interior surface, for example a side or rear interior surface.

In FIG. 1A, the display device 101 is in a downward position. In the downward position, the display device faces a direction of the floor of the vehicle. The back surface of the display device 101 is viewable to an occupant of the vehicle when the display device is in the orientation illustrated in FIG. 1A. It should be appreciated that in the downward position, the display screen 101A may be used as an ambient light source. Thus, light may be emitted from the display screen 101A when the screen is located in the downward position.

Figure 1B:
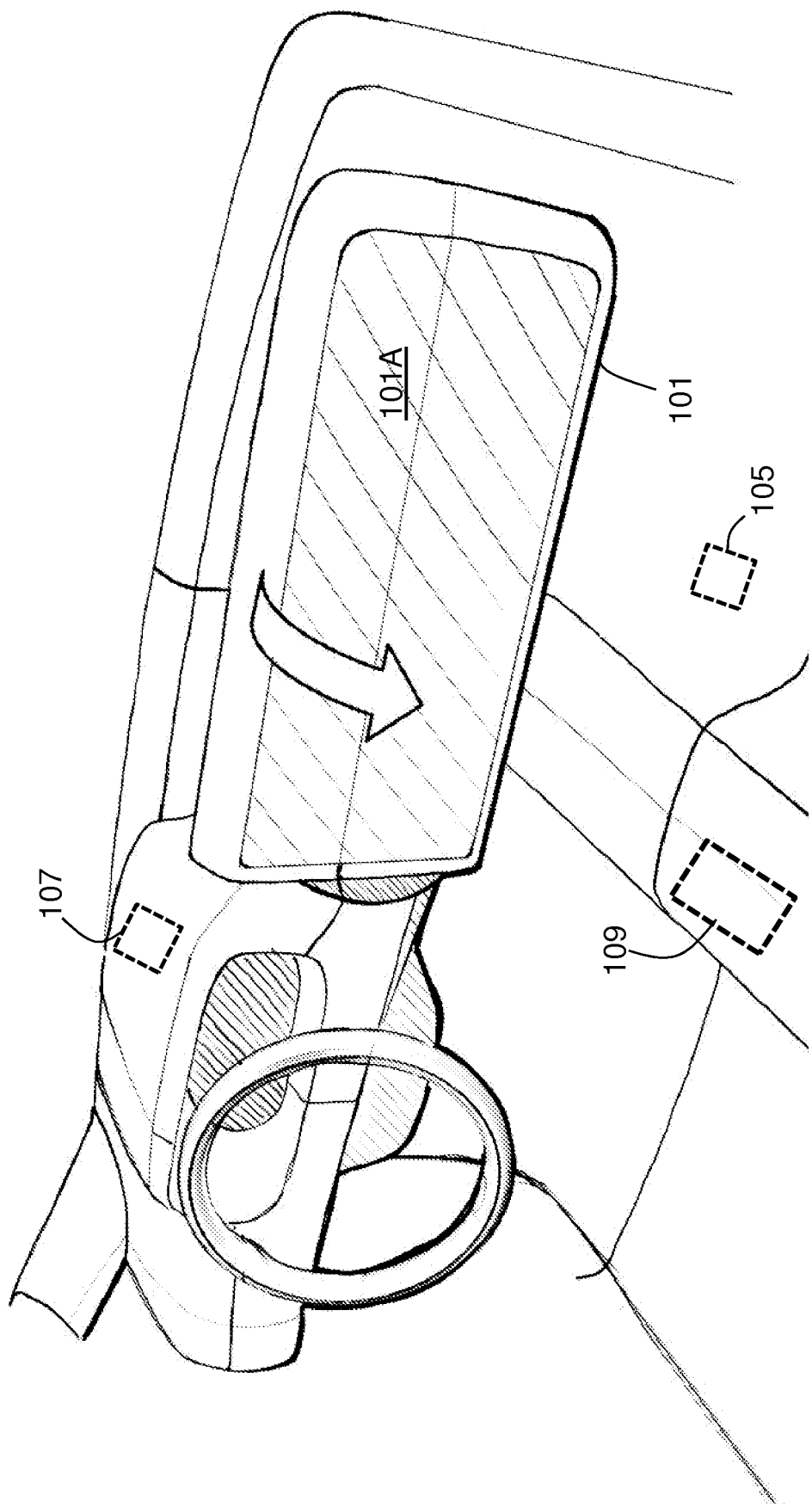

The display screen is configured to pivot from the downward position to an upward position. FIG. 1B illustrates the display device 101 in the upward position. In the upward position, the display screen 101A faces a backend of the vehicle. In the full upward position, the multimedia displayed on the screen 101A is viewable by the occupants in the vehicle. The multimedia content displayed on the display screen may be preprogrammed or saved. Furthermore, the multimedia content may be downloaded via a wireless connection. According to some of the example embodiments, the multimedia content is provided via cloud based services, entertainment and/or broadcast television.

It should be appreciated that since the display device is located in the interior panel where, for example, a glove compartment may be found, the display is below the eye level of occupants of nearby vehicles. Thus, the location of the display device provides for private viewing of the multimedia for occupants in the vehicle in which the display assembly is located.

The display assembly further comprises a control unit to initiate a rotation of the pivot to move the display device from the downward position to the upward position and vice versa. The control unit may be located within the back surface of the display device, as illustrated by control unit 103. The control unit may also be located within the flooring of the vehicle, as illustrated by control unit 105. The control unit may also be located anywhere within the interior panel of the vehicle, as illustrated by control unit 107. It should be appreciated that the control unit may be situated anywhere in the vehicle where electronics may be housed.

According to some of the example embodiments, the display assembly may comprise a user input device 109. An occupant in the vehicle may use the user input device 109 to enter commands with respect to controlling the pivoting or multimedia display content of the display device.

In the examples provided by the figures, the user input device is located in area between the two front seats of the vehicle. It should be appreciated that the user input device may be located anywhere within the vehicle, for example, the user input device may be attachable to the front seat of the vehicle.

According to some of the example embodiments, the display device 101 may be configured to move to the upward position upon a user provided command via the user input device or a preconfigured setting. An example of a preconfigured setting may be that the display device 101 is configured to move to an upward position once the vehicle switches from a manual driving mode to an autonomous driving mode. Once the vehicle is in an autonomous driving mode, the occupants of the vehicle may engage in activities that may not be possible in a manual driving mode, such as watching multimedia content.

Thus, the control unit may be configured to detect when the vehicle enters an autonomous driving mode and thereby initiate a rotation of the display device 101 to the upward position. The control unit may further be configured to detect an imminent end of the autonomous driving mode thereby causing a rotation of the display device to the downward position.

According to some of the example embodiments, if the dimensions of the display screen are large, for example, the assembly may measure as much as 600-700 mm in horizontal direction, the display device 101 may only be configured to rotate in an upward position if the seat immediately in front of the display device is in a refracted position or within a predetermined distance from the display screen. Such a position typically occurs once the vehicle is in an autonomous driving mode.

A further example of a preconfigured setting which may cause the control unit to initiate a rotation of the display device is seat retraction. According to some of the example embodiments, the control unit may detect that one of the front seats has retracted in a rearward direction a predetermined amount. The predetermined amount of retraction may be based on an optimal viewing distance of the occupant based on the size of the display screen. The front seat may be either the passenger or driver seat. Thus, according to some of the example embodiments, once the control unit determines that a vehicle occupant is in range of optimal viewing, the display device will be rotated in the upward position.

It should be appreciated that the control unit is also configured to initiate a rotation of the display device from and upward position to a downward position. The downward rotation may be initiated by a user command, an expected end to an autonomous driving mode, and/or a seat refraction in a forward direction, for example, once a vehicle occupant is no longer within an optimal viewing range.

Figure 1C:
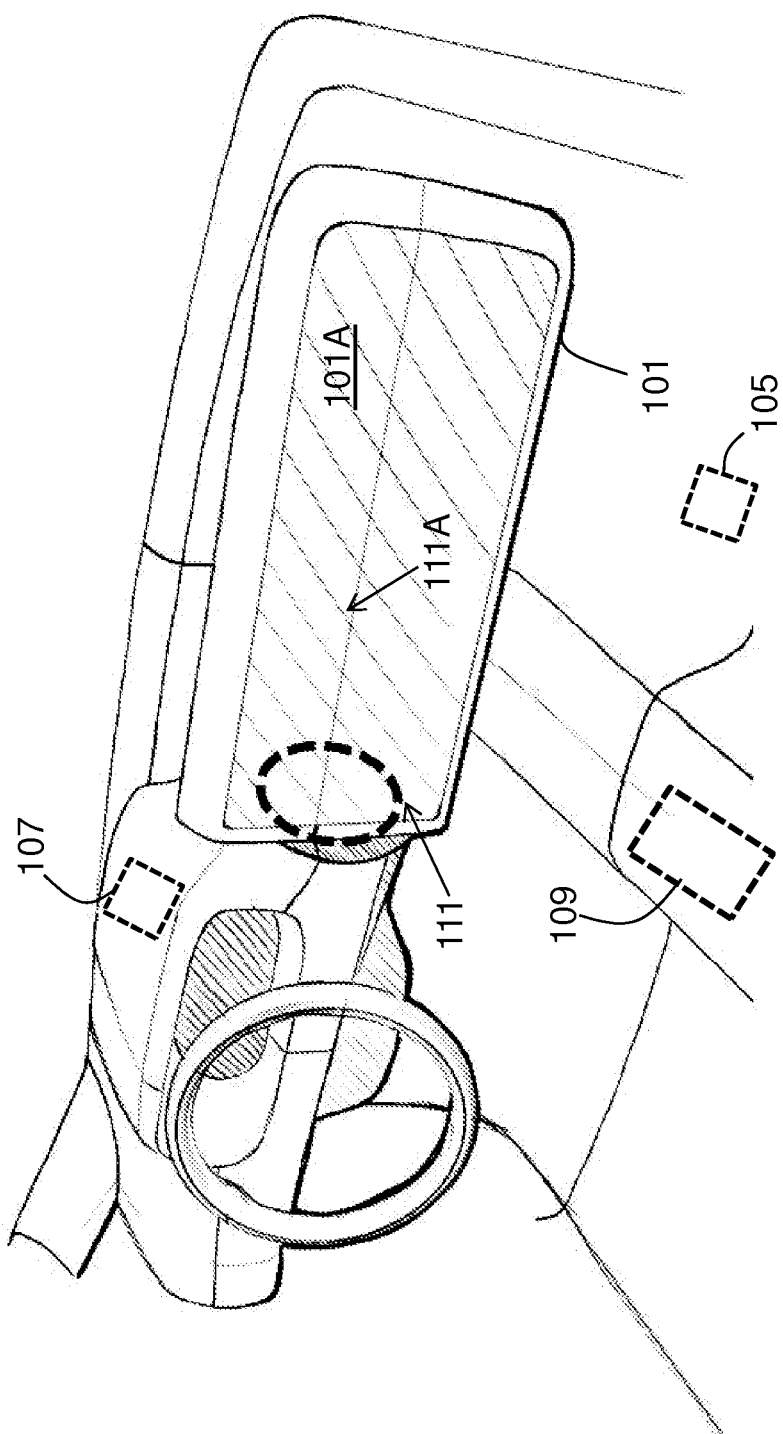

FIG. 1C illustrates a location of a pivot 111 for the display device 101. As the display device 101 of FIGS. 1A-1C is only connected to the interior panel on the leftmost side edge of the device, only a single pivot is needed to rotate the display screen 101 to and from the upward and downward positions. According to some of the example embodiments, the control unit will initiate the rotation of the pivot 111 such that the display device rotates to and from the downward and upward positions along a pivot axis 111a.

Figure 2A:
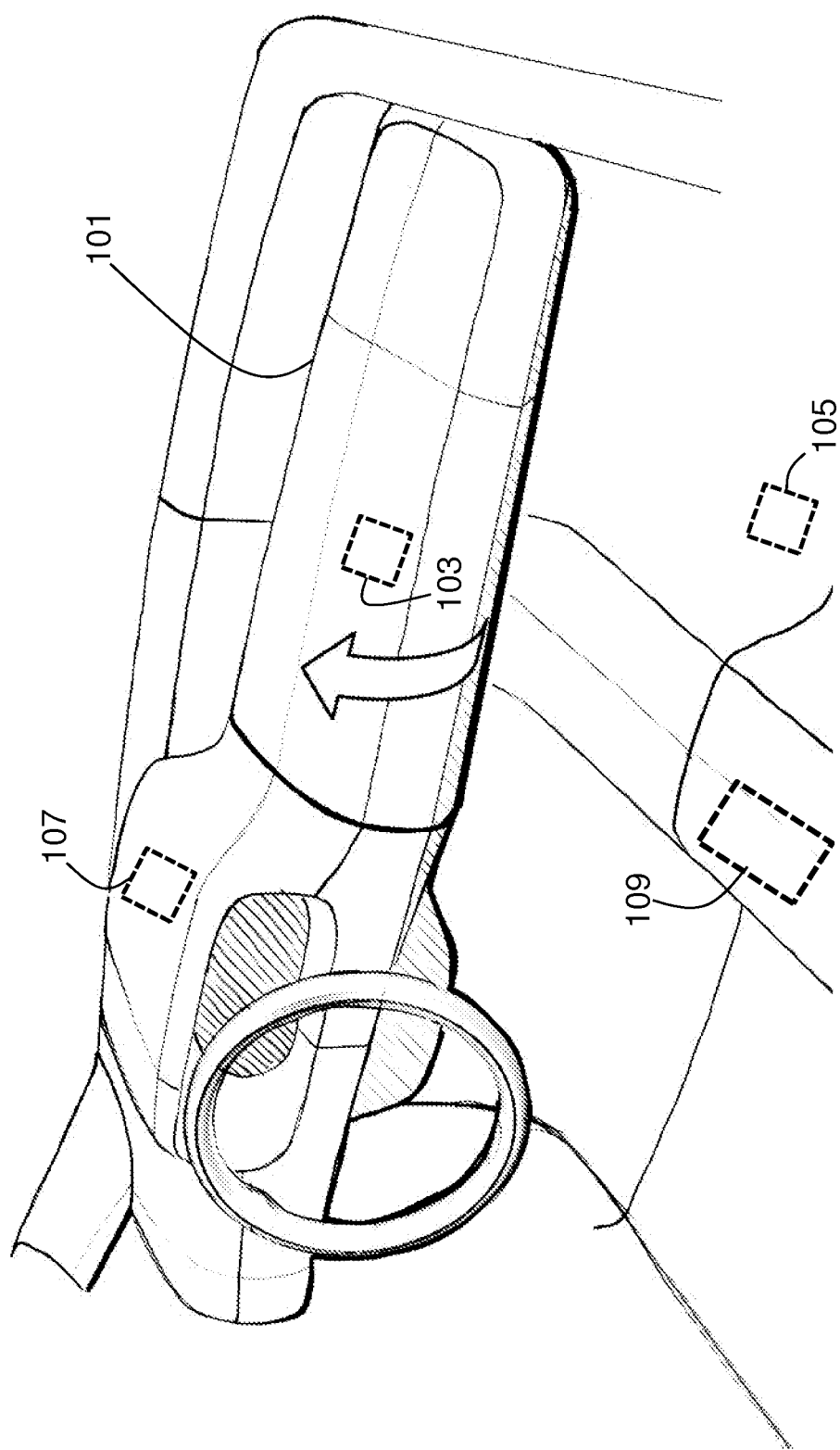
FIGS. 2A-2C are illustrative examples of a dual pivot display assembly, according to some of the example embodiments.
Figure 2B:
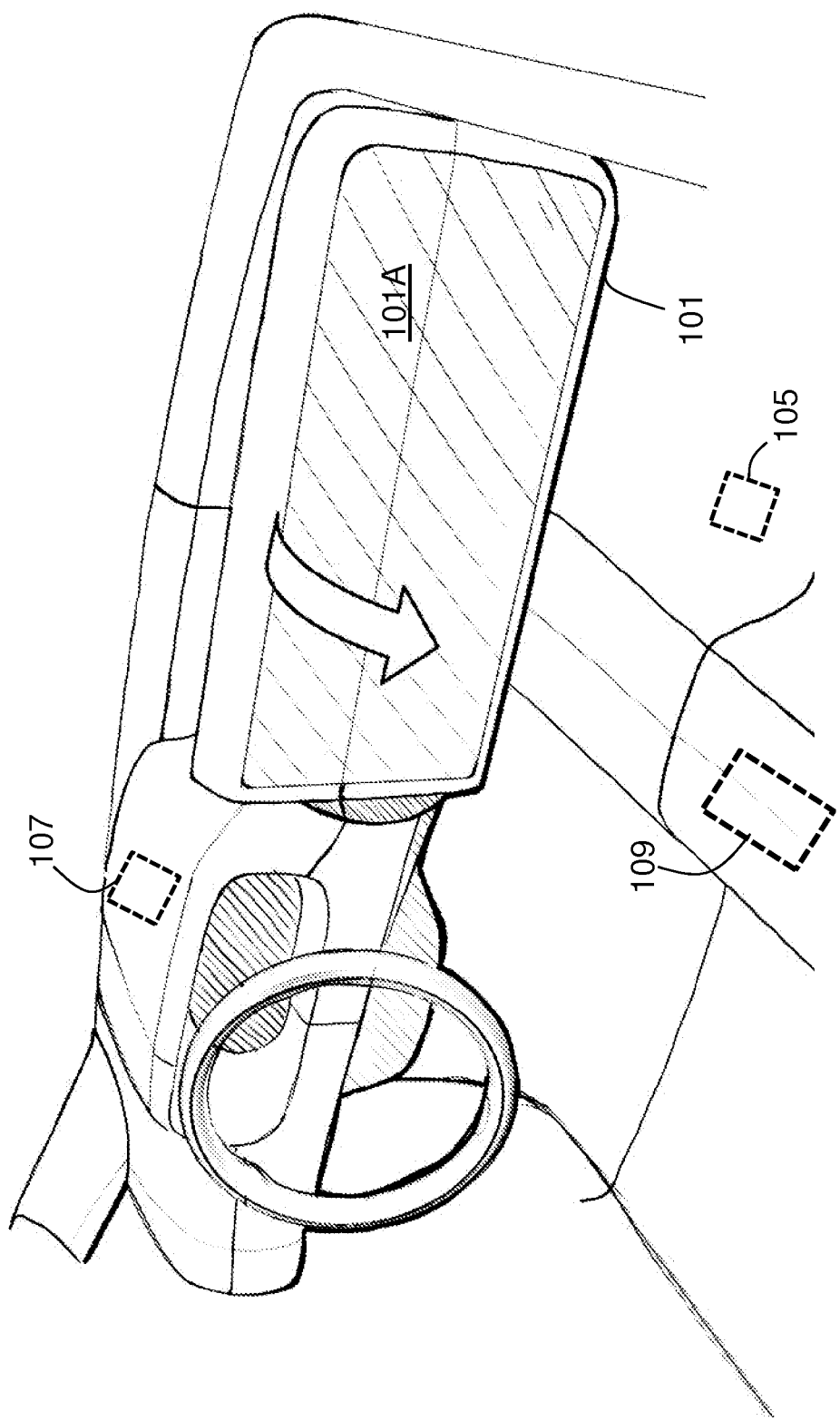

FIG. 2A illustrates an example of the display device 106 where both the leftmost and rightmost ends of the display device are in connection with the interior panel. In FIG. 2A, the displace device 106 is in the downward position, and thus, the display screen is not viewable to occupants in the vehicle. FIG. 2B illustrates the display device in the upward position where the multimedia contents of the display screen 101A are viewable to the occupants in the vehicle.

Figure 2C:
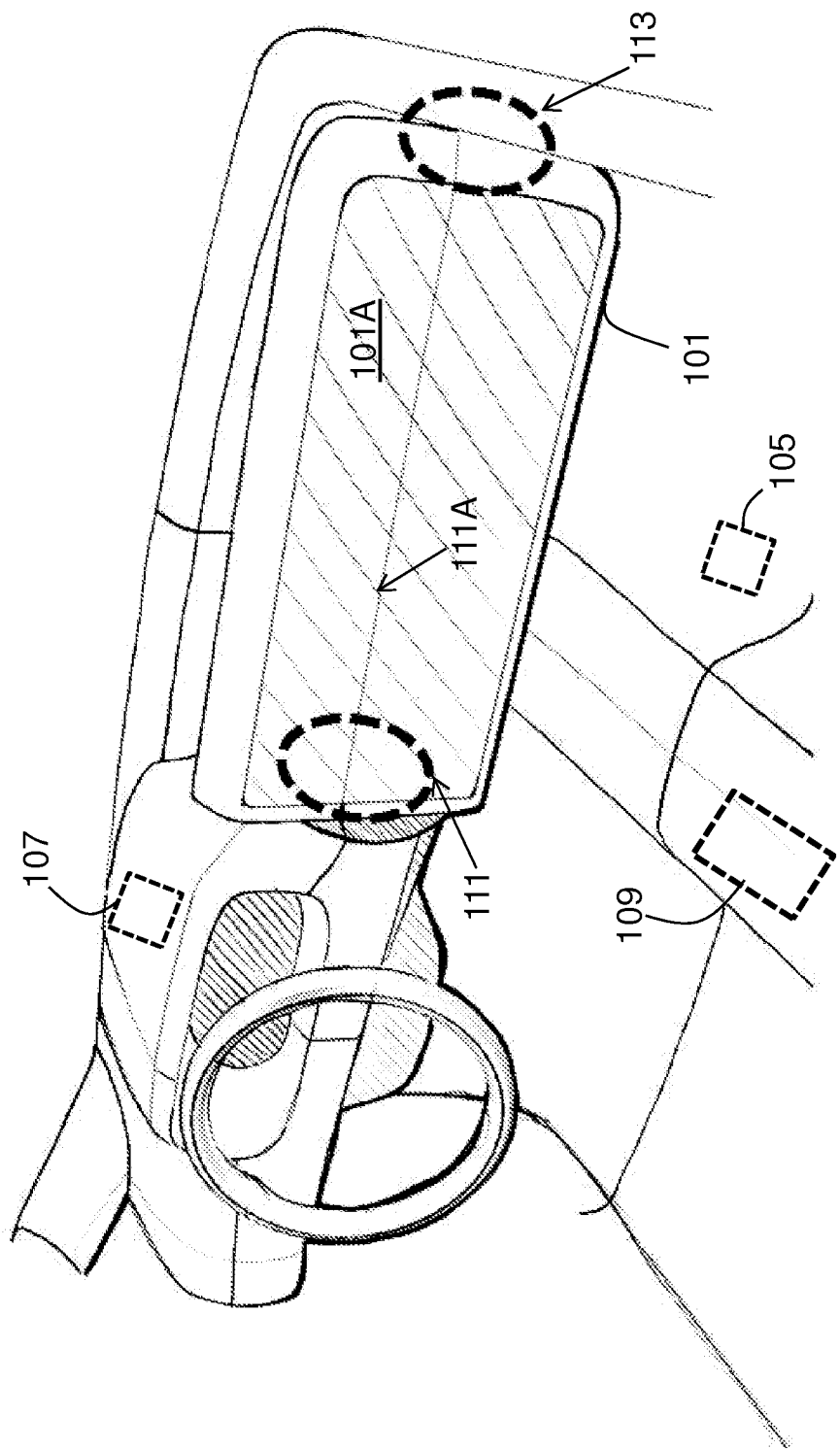

FIG. 2C illustrates the location of the pivots 111 and 113 of the display device 106. The pivots 111 and 113 are located on side edges of the display device 106 such that the pivots are facing opposite of one another. According to some of the example embodiments, the control unit will initiate the rotation of the pivots 111 and 113 such that the display device rotates to and from the downward and upward positions. The rotation will occur along a pivot axis 111a. Similar to the display device of FIGS. 1A-1C, the rotation of the display device 106 may be initiated by the control unit as a result of a user provided command via the user input device 109 or a predetermined setting, for example, the start or end of an autonomous driving mode or seat retraction.

Figure 3:
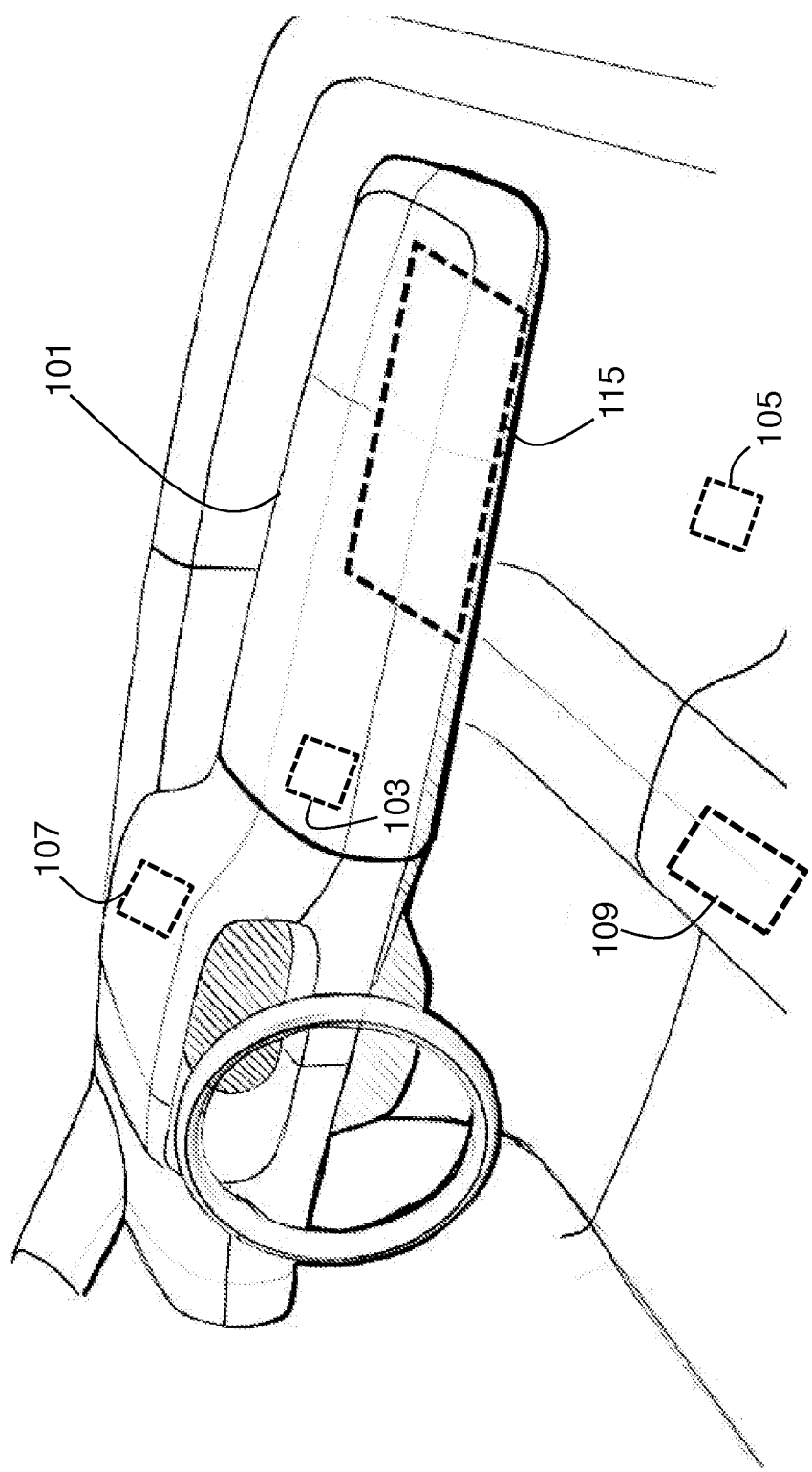
FIG. 3 is an illustrative example of a back compartment of the display screen, according to some of the example embodiments.

FIG. 3 illustrates a storage compartment 115 that may be provided on a back surface of the display device 101. The storage compartment 115 may be in the form of a glove compartment, an air distribution system, or an airbag occupant protection system. The display device of FIG. 3 is a single pivot display device 101. It should be appreciated that the dual pivot display device 106 may also comprise a storage compartment on the back surface of the display device. The back surface of the display device may comprise a soft surface such that when the display device is in the downward position, the occupant will be exposed to the soft surface.

Figure 4B:
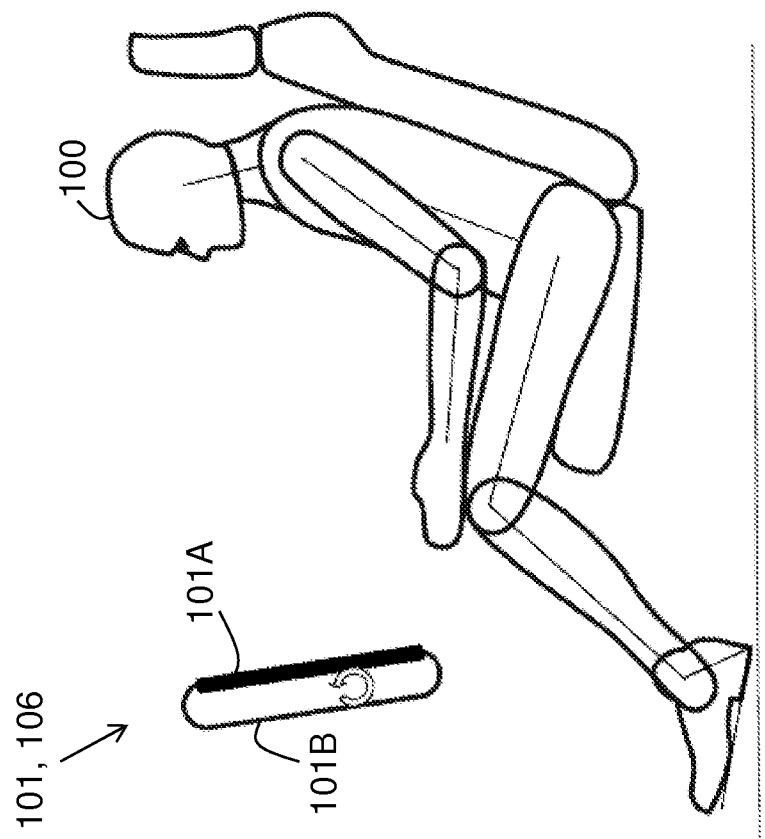
FIGS. 4A and 4B illustrative an example of the display device being utilized as a working space as well as for viewing multimedia, respectively, according to some of the example embodiments.
Figure 4A:
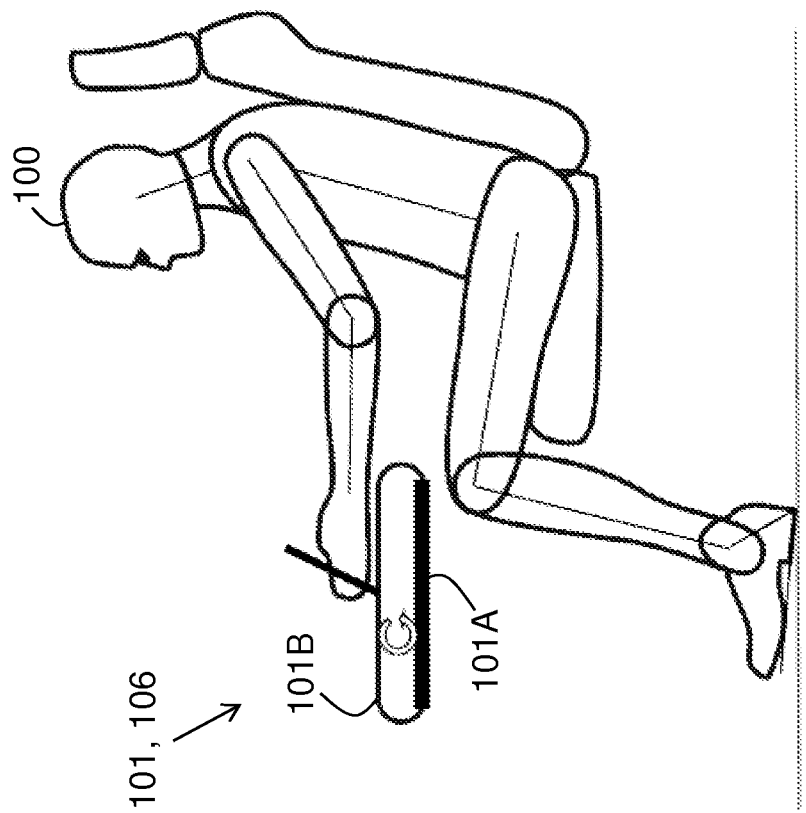

According to some of the example embodiments, the back surface of the display device may be used as a working surface, for example, in the form of a coffee table, when the display device is in a downward position. FIG. 4A illustrates an occupant 100 of the vehicle utilizing the back surface 101B of the display device as a workspace. It should be appreciated that either the single pivot display device 101 or the dual pivot device 106 may be employed when using the display device as a workspace. A non-limiting example dimension of such a workspace may be a width of approximately 60 cm and a height of approximately 25 cm.

According to some of the example embodiments a hard cover may be applied to the back surface 101B when the display device 101, 106 is to be used as a workspace. An example benefit of applying the hard surface is that when the display device 101, 106 is not used as a workspace, a soft back surface 101B will be exposed to the occupant. Thus, if the occupant accidently comes into contact with the back surface 101B, a softer surface may provide more comfort for the occupant. FIG. 4B illustrates the occupant 100 utilizing the same display device 101, 106 of FIG. 4A to view multimedia. Thus, display device 101, 106 of FIG. 4A may be utilized in the same manner as discussed herein.

Figure 5B:
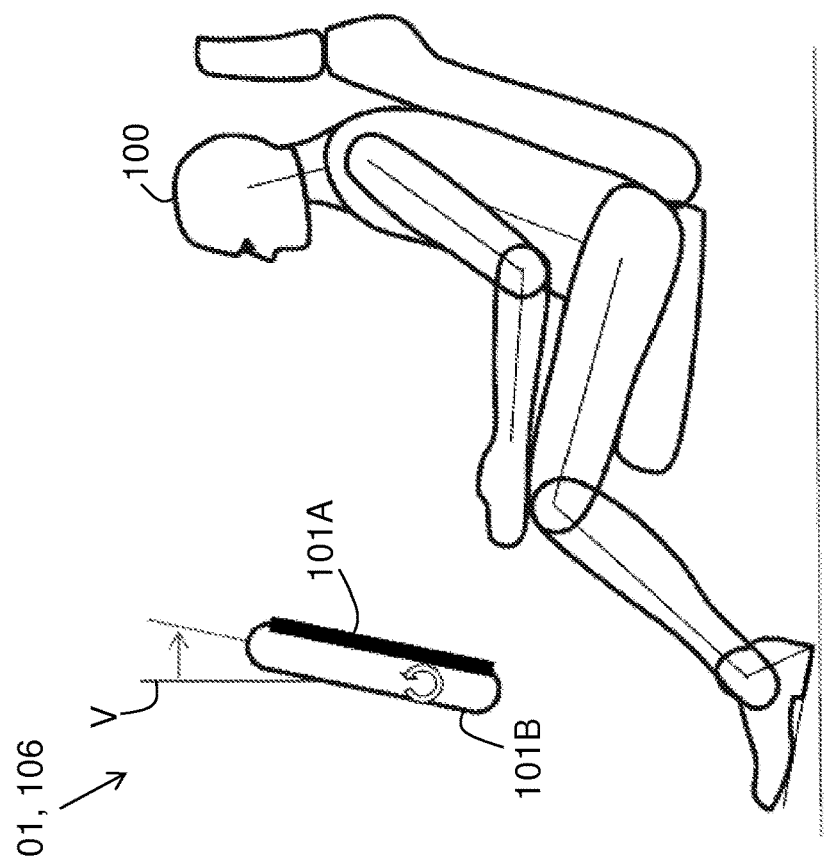
FIGS. 5A and 5B illustrate adjustment functionality of the display device, according to some of the example embodiments.
Figure 5A:
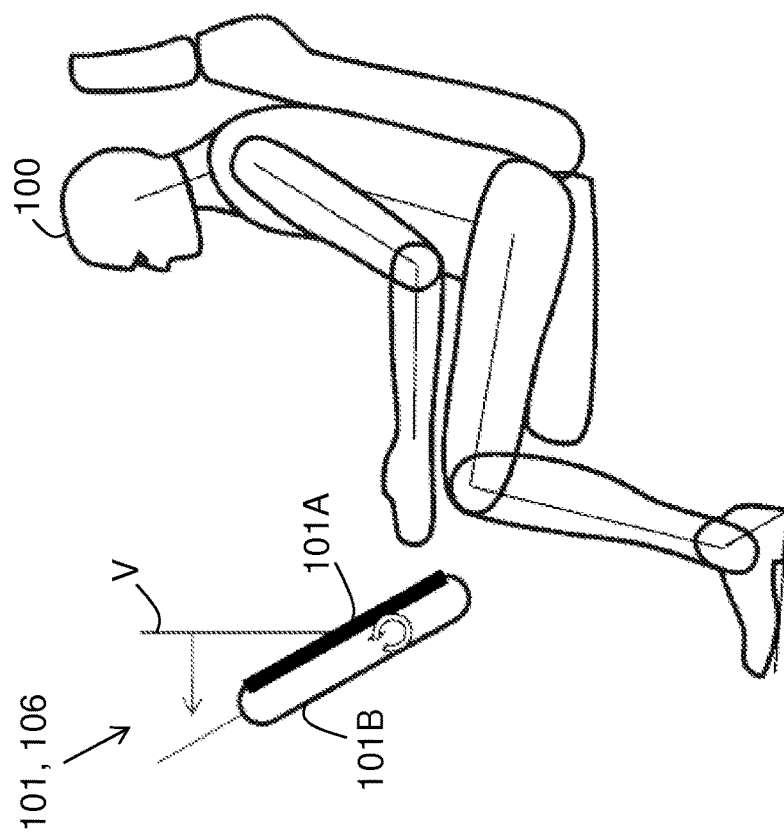

FIGS. 5A and 5B illustrate the adjustability of the display device 101, 106. In FIG. 5A, the display device 101, 106 is tilted beyond the vertical V in order to provide a better viewing angle of the display screen 101A for the occupant 100. In FIG. 5B, the display device 101, 106 is tilted downward from the vertical V in order to reduce glare on the display screen 101A.

It should be appreciated that the display device 101, 106 may not only be utilized for the occupant sitting directly in front of the device but for any occupant in the vehicle. Occupants sitting in the back of the vehicle or adjacent to the occupant directly in front of the display device may also view the multimedia on the display screen 101A FIG. 6 illustrates a flow diagram depicting example operations that may be taken by the display assembly of FIGS. 1A-5B. In the example operations of FIG. 6, it is assumed that the display device is initially in a downward position such that the display screen is facing a direction of the floor of the vehicle.

It should also be appreciated that FIG. 6 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 10

According to some of the example embodiments, the display screen 101A may be configured to provide 10 an ambient light source when the display device 101 or 106 is in the downward position.

When the display device 101 or 106 is in the downward position, as illustrated in FIGS. 1A and 2A, respectively, the display screen 101A may be illuminated thereby providing the ambient light source. This has the example advantage of the display assembly having a purpose of use besides displaying multimedia content in the upward position. It should be appreciated that in the downward position, the display device back surface of the display device may be utilized for or comprise a storage compartment, air distribution system, an air bag occupant protection system, and/or a working surface.

Operation 12

The display assembly is configured to receive 12 an indication to move the display device from the downward position to an upward position. In the upward position, the display screen is facing a backend of the vehicle. The control unit 103, 105, or 107 is configured to initiate the rotation from the downward position to the upward position.

According to some of the example embodiments, the indication is in the form of a user command provided by the user input device 109. The user input device 109 may be located anywhere within the vehicle such that an occupant of the vehicle may have access to the device.

Furthermore, according to some of the example embodiments, the user input device 109 may be situated in the vehicle such that the user input device 109 maintains a predetermined distance from a front seat of the vehicle. This may be accomplished by the user input device being attachable to the front seat. In such example embodiments, the vehicle may be in a manual or autonomous driving mode.

According to some of the example embodiments, the indication is in the form of an expected start to an autonomous driving mode. During the autonomous driving mode, the occupants of the vehicle may engage in activities that may otherwise not be possible during manual driving modes. If the dimensions of the display screen are particularly large, having the display device in the upward position during a manual driving mode may be distracting to the driver of the vehicle. Thus, setting an indication to be an expected start of an autonomous driving mode has the example advantage of ensuring minimized driver distraction when using larger display screens.

According to some of the example embodiments, the indication is in the form of a front seat retraction. For example, the control unit may detect that the front seat has refracted a predetermined distance away from the display device 101 or 106. Upon detection of the seat refraction, the display device may be configured to rotate in the upward position. The predetermined distance may be based on a distance or range of optimal view of the display screen. Such a distance may be based on the dimensions and other characteristics of the screen. In such example embodiments, the vehicle may be in a manual or autonomous driving mode. The front seat may be a driver and/or passenger seat.

Operation 14

The control unit 103, 105, or 107 is configured to rotate 14 the display device 101 or 106 to the upward position upon receipt of the indication 12. After receiving the indication as described in operation 12. The control unit will initiate a rotation of the display device 101 or 106 by causing a rotation of the pivots such that the display device is rotated along the pivot axis 111A. It should be appreciated that operation 14 may be performed on both the single pivot embodiment of FIGS. 1A-1C and the dual pivot embodiment of FIGS. 2A-2C.

Example Operation 18

According to some of the example embodiments, the control unit 103, 105, or 107 is further configured to rotate 18 the display device 101 or 106 in the downward position from the upward position upon receiving a user command, a retraction of a vehicle front seat in a forward direction a predetermined distance, or upon an expected end to the autonomous driving mode.

Similar to operation 12, the control unit will also be configured to initiate a rotation of the display device to bring the device back to the downward position upon receiving an indication in the form of a user command, upon an expected end to the autonomous driving mode or upon a detection of a front seat retraction of a predetermined distance.

As one skilled in the art would understand, the control unit 103, 105, 107 may include any suitable hardware and/or software, such as one or more processors (e.g., one or more microprocessors, microcontrollers and/or programmable digital signal processors) in communication with one or more storage devices or media including computer readable program instructions that are executable by the one or more processors so that the control unit may perform particular algorithms represented by the functions and/or operations described herein. The control unit 103, 105, 107 may also, or instead, include one or more application specific integrated circuits, programmable gate arrays or programmable array logic, programmable logic devices, or digital signal processors.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims. Additionally, the features of various implementing embodiments may be combined to form further embodiments according to the disclosure.

What is claimed is:

1. A display assembly for an interior panel of a vehicle, the display assembly comprising:
    a display device with a display screen on a front surface, the front surface being configured to face a direction of a floor of the vehicle when the display device is in a downward position;
    a pivot connectable to an edge of the display device and a surface of the vehicle interior panel; and
    a control unit configured to initiate rotation of the display device, upon detection of the vehicle entering an autonomous driving mode and a retraction of a seat adjacent the display device, from the downward position to an upward position such that the display screen faces a backend of the vehicle;
    wherein the display device includes first and second opposite lateral ends, the display device is connectable at the first lateral end to the vehicle interior panel via the pivot so that the display device is pivotable about a pivot axis that extends through the first and second lateral ends, and the second lateral end is configured to be a free end that is not connectable to the vehicle interior panel, and wherein the pivot axis extends laterally in the vehicle when the display assembly is mounted in the vehicle.

2. The display assembly of claim 1 further comprising a user input device configured to receive a user command from a vehicle occupant, the control unit being configured to initiate rotation of the pivot upon receipt of the user command.

3. The display assembly of claim 2 wherein the user input device is attachable to at least one front seat of the vehicle.

4. The display assembly of claim 1 wherein the display screen is configured to provide an ambient light source when the display device is in the downward position.

5. The display assembly of claim 1 wherein a back surface of the display device comprises a storage compartment, air distribution system, an air bag occupant protection system, and/or a working surface.

6. The vehicle of claim 1 wherein the control unit is further configured to initiate a rotation of the display device from the upward position to the downward position upon receipt of a user command, a movement of the seat in a forward direction a predetermined distance, or an expected end of the autonomous driving mode.

7. A method for operating a display assembly on an interior panel of a vehicle, the display assembly comprising a display device with a display screen on a front surface of the display device, the front surface being configured to face a direction of a floor of the vehicle when the display device is in a downward position, the display assembly further comprising a pivot connected to an edge of the display device and a surface of the interior panel, the method comprising:
- receiving an indication to move the display device from the downward position to an upward position in which the front surface of the display device faces a backend of the vehicle, the indication being based on a detection of the vehicle entering an autonomous driving mode and a retraction of a seat adjacent the display device; and
- rotating the display device, via the pivot, to the upward position upon receipt of the indication;
- wherein the display device includes first and second opposite lateral ends, the display device is connected at the first lateral end to the interior panel via the pivot so that the display device is pivotable about a pivot axis that extends through the first and second lateral ends, and the second lateral end is configured to be a free end that is not connected to the interior panel, and wherein the pivot axis extends laterally in the vehicle.

8. The method of claim 7 wherein the seat is a vehicle front seat and the retraction comprises movement of the front seat in a rearward direction a predetermined distance.

9. The method of claim 7 further comprising rotating the display device to the downward position from the upward position upon receiving a user command, a movement of the seat in a forward direction a predetermined distance, or upon an expected end to the autonomous driving mode.

10. The method of claim 9 further comprising providing an ambient light source via the display screen when the display device is in the downward position.

11. A non-transitory computer readable medium comprising program instructions for operating a display assembly provided on an interior panel of a vehicle, the display assembly comprising a display device with a display screen that defines a front surface of the display device, the front surface being configured to face toward a floor of the vehicle when the display device is in a downward position, the display assembly further comprising a pivot connected to an edge of the display device and a surface of the vehicle interior panel, wherein the program instructions are executable by one or more processors of a computer system to:
- upon receipt of an indication to move the display device from the downward position to an upward position in which the front surface of the display device faces a backend of the vehicle, rotate the display device, via the pivot, to the upward position so that the display device rotates only a about a single pivot axis, wherein the indication is based on a detection of the vehicle entering an autonomous driving mode and a retraction of a seat adjacent the display device;
- wherein the display device includes first and second opposite lateral ends, the display device is connected at the first lateral end to the interior panel via the pivot so that the display device is pivotable about a pivot axis that extends through the first and second lateral ends, and the second lateral end is configured to be a free end that is not connected to the interior panel, and wherein the pivot axis extends laterally in the vehicle.

12. The computer readable medium of claim 11 further comprising executable instructions to rotate the display device to the downward position from the upward position upon receiving a user command, a movement of the seat in a forward direction a predetermined distance, or upon an expected end to the autonomous driving mode.

13. The computer readable medium of claim 11 further comprising executable instructions for providing an ambient light source via the display screen when the display device is in the downward position.

14. The display assembly of claim 1 wherein the display assembly is configured so that the rotation of the display device occurs along a single pivot axis, and so that the display device is not otherwise movable.

15. The display assembly of claim 14 wherein the display device has a length of 600-700 mm in a horizontal direction along a width of the vehicle.

16. The method of claim 7 wherein the rotating is performed so that the display device rotates only about a single pivot axis.

17. The method of claim 16 wherein the display device has a length of 600-700 mm in a horizontal direction along a width of the vehicle.

18. The computer readable medium of claim 11 wherein the display device has a length of 600-700 mm in a horizontal direction along a width of the vehicle.

19. The display assembly of claim 1 wherein, when the display device is mounted in the vehicle and in the downward position, a back surface of the display device is viewable by an occupant of the vehicle positioned immediately adjacent to the display device, and no portion of the interior panel extends between the display device and the occupant, and wherein the display device is only rotatable about the pivot axis that extends through the first and second lateral ends.

20. The display assembly of claim 1 wherein, when the display device is mounted in the vehicle and in the downward position, the display device is configured to form a panel adjacent the interior panel and proximate a steering wheel of the vehicle, so that the panel and the interior panel form a continuous panel arrangement.

21. The display assembly of claim 20 wherein, when the display device is mounted in the vehicle, the display device has a length of 600-700 mm in a horizontal direction along a width of the vehicle.

22. The method of claim 17 wherein the display device forms a panel adjacent the interior panel and proximate a steering wheel of the vehicle, so that the panel and the interior panel form a continuous panel arrangement.

23. A display assembly for an interior panel of a vehicle, the display assembly comprising:
- a display device with a display screen on a front surface, the front surface being configured to face a direction of a floor of the vehicle when the display device is in a downward position;
- a pivot connectable to an edge of the display device and a surface of the vehicle interior panel; and
- a control unit configured to initiate rotation of the display device, upon detection of the vehicle entering an autonomous driving mode and a retraction of a seat adjacent the display device, from the downward position to an upward position such that the display screen faces a backend of the vehicle;
- wherein, when the display device is mounted in the vehicle and in the downward position, a back surface of the display device is viewable by an occupant of the vehicle positioned immediately adjacent to the display device, and no portion of the interior panel extends between the display device and the occupant, and wherein the display device is only rotatable about an axis that extends through the display device and toward the interior panel.

24. The display assembly of claim 23 wherein the display device includes first and second opposite lateral ends, the display device is connectable at the first lateral end to the vehicle interior panel via the pivot, and, when the display assembly is mounted in the vehicle, the axis extends laterally in the vehicle through the first and second lateral ends.

25. The display assembly of claim 23 wherein, when the display device is mounted in the vehicle, the display device has a length of 600-700 mm in a horizontal direction along a width of the vehicle.

26. The display assembly of claim 23 wherein, when the display device is mounted in the vehicle and in the downward position, the display device is configured to form a panel adjacent the interior panel and proximate a steering wheel of the vehicle, so that the panel and the interior panel form a continuous panel arrangement.

* * * * *